United States Patent [19]

Korpel

[11] 4,193,090
[45] Mar. 11, 1980

[54] OPTICAL DETECTION SYSTEM FOR SIMULTANEOUSLY INTERROGATING A PLURALITY OF TRACKS

[75] Inventor: Adrianus Korpel, Prospect Heights, Ill.

[73] Assignee: Zenith Radio Corporation, Glenview, Ill.

[21] Appl. No.: 824,681

[22] Filed: Aug. 15, 1977

[51] Int. Cl.² ............................................. H04N 5/76
[52] U.S. Cl. ......................... 358/128.5; 179/100.3 V
[58] Field of Search .................. 360/77, 8, 9; 365/124, 365/127, 215, 234; 179/100.3, 100.3 B, 100.3 G, 100.3 V; 358/128

[56] References Cited

U.S. PATENT DOCUMENTS

| | | | |
|---|---|---|---|
| 3,701,846 | 10/1972 | Zenzefilis | 358/128 |
| 3,795,902 | 3/1974 | Russell | 358/128 X |
| 3,833,769 | 9/1974 | Compaan et al. | 358/128 X |
| 3,838,401 | 9/1974 | Graf et al. | 179/100.3 G |
| 3,911,483 | 10/1975 | Kihara et al. | 360/77 |
| 3,919,465 | 11/1975 | Adler et al. | 179/100.3 V |
| 3,919,562 | 11/1975 | Whitman | 179/100.3 V |
| 4,015,285 | 3/1977 | Roméas | 179/100.3 V |

Primary Examiner—Bernard Konick
Assistant Examiner—Donald E. McElheny, Jr.
Attorney, Agent, or Firm—Cornelius J. O'Connor

[57] ABSTRACT

The present invention relates in general to an optical video detection system for retrieving recorded information. More particularly, the invention relates to an optical detection system whereby optical means focus a laser beam into a reading spot of an area sufficient to interrogate, simultaneously, a plurality of the light scattering elements in at least two adjacent segments of the spiral track. The reading spot further has a dimension in the longitudinal direction of the track such that the spot is incapable of resolving the recorded carrier. Since the information content of adjacent tracks is substantially the same, averaging of the nonscattered light by a photodetector will provide a useful replica of the baseband signal, that is the video signal, modulated upon the carrier.

5 Claims, 4 Drawing Figures

OPTICAL DETECTION SYSTEM FOR SIMULTANEOUSLY INTERROGATING A PLURALITY OF TRACKS

BACKGROUND OF THE INVENTION

Video discs systems are known in which a video program pre-recorded upon a disc, is played back through a television receiver by resort to a procedure which, in general, bears some similarity to the playback of audio records. While these known playback systems contemplate a variety of approaches, e.g., optical, capacitive, mechanical (pressure), etc., the present invention finds particular application to an optical system, accordingly, the invention will be described in that environment.

Optical image reproducing systems that permit playback of pre-recorded program material through a television receiver have been proposed to augment the utility of such receivers. In one system the program is stored in a disc, not unlike the familiar audio disc, which is interrogated by a beam of coherent light derived from a laser and converged by lens action to a finely focused reading spot. Subsequent to interrogation, the beam is monitored by a light responder, or photodetector, which serves to develop an electrical signal representative of the stored information.

The stored program can include luminance, chroma and audio information, as well as synchronizing components. This information is positioned in segments of the frequency spectrum which are convenient for disc recording, but at the same time, are readily subject to transformation in a transcoder to a frequency distribution typical of a commercial telecast. Since such telecasts feature two interlaced fields for each picture frame, the storage track of the video disc favors the form of a multi-turn spiral in which each convolution of the spiral contains two fields of an image frame together with synchronizing information.

Program information may be stored in the multi-turn spiral track of an optical video disc in a variety of ways, for example, in the form of hill and dale grooves similar to audio recordings, or, in a succession of pits alternating with lands. While the invention can be used with either type of recording, there presently appears to be greater interest in the pit and land arrangement, therefore, the invention will be described in connection with a storage track of that format.

In one approach, the pits and lands constituting the information storage track are of uniform width and length and the information is encoded as a rate variation of the train of pits with a nominal 50% duty cycle. In another encoding scheme, the width of the pits is maintained uniform but their length, along the track direction, is varied or modulated to encode the information. In either case, the pits and lands collectively comprise a spatial counterpart of an RF carrier signal, modulated in frequency or duty cycle. The modulated RF signal, in any event, conveys the program information and thus is employed in the recording process to control the fomration of a storage track on a disc master.

The stored information is retrieved by scanning the track with a light beam and utilizing a light responsive device, e.g., a photodetector, to monitor the beam subsequent to its interrogation of the track. In the case where the disc is transmissive to the reading beam, the photodetector can be positioned beneath the disc to collect a portion of the light transmitted therethrough. On the other hand, if the disc is a reflective device, the photodetector is located on the same side of the disc as the incident, or reading beam so as to respond to light reflected from the track. In either instance, the pits deflect or scatter the light of the reading beam causing the light responsive device to develop an electrical signal representative of the information stored in the disc.

Although the term scattering is commonly used to describe, in general, the effect of small pits or irregularities on a beam of incident light, we shall use this term in a more specific sense, that is, as it relates to a particular type of video disc, the so-called half wavelength, type. In this type of disc the depth of the pit is so chosen that there exists a one-half wavelength optical path difference between rays traversing a pit and the rays traversing the adjoining land area.

We shall use the term deflection in connection with the so-called one-quarter wavelength type of disc. In this type of disc, which is described in U.S. Pat. No. 3,931,459 and which issued to the present inventor and is assigned to the present assignee, the depth of the pit is chosen so that there exists a one-quarter wavelength optical path difference between rays traversing a pit and the rays traversing the adjoining land area.

Historically, the one-quarter wavelength system has been used with transmissive discs while the one-half wavelength system has found preference in connection with reflective discs. However, there are no compelling technical reasons for this and, in theory, transmissive and reflective discs are possible in either system. An optical video system having particular application to a transmissive type disc is described in U.S. Pat. No. 3,919,562 which issued to Robert L. Whitman on Nov. 11, 1975. On the other hand, an optical video system operating in the reflective mode is described in U.S. Pat. No. 3,959,581 which issued on May 25, 1976 to Leonard J. Laub.

In a known optical detection scheme, the information is retrieved by focusing the light of a laser beam to form a reading spot small enough to resolve the spatial frequency of the frequency modulated carrier. In this practice, severe requirements are imposed on the focusing apparatus to insure that any vertical excursions of the interrogated portion of the disc track are confined to a very narrow range since the depth of focus of an optical system capable of resolving the spatial frequency of the carrier is, of necessity, minute. Moreover, when the spatial counterpart of the carrier is optically detected and converted to an electrical signal representative of the modulated RF carrier, that signal must then be processed by a frequency discimiantor in order to extract the information which was frequency modulated on the carrier.

In the subject teaching, consideration will be given to an optical detection system in which the reading spot is of a dimension that permits it to cover more than one track. Since adjacent tracks correspond to successive frames in the conventional 1800 RPM video disc format, reading adjacent track segments simultaneously can be tolerated because of the redundant nature of the recorded television program, i.e., one frame is much like the next, insofar as video content is concerned.

One advantage that is suggested in reading two or more tracks is that the track density, i.e., track spacing, can be increased which would permit playing time to be increased. It should be noted however, that this scheme cannot readily be used in a system in which a high frequency carrier is read out by a read beam capable of resolving the carrier. This obtains because there will, at times, be a destructive interference between the carrier signals on adjacent tracks and this interference will effectively destroy any output signal. If destructive interference is to be avoided, care must be taken that the carrier signals on adjacent tracks always remain in phase. This phasing relationship is not only very difficult to achieve in practice, but, in the case where use of a frequency modulated carrier is contemplated, it would be impossible since the phase changes continuously in a frequency modulation scheme.

OBJECTS OF THE INVENTION

Accordingly, it is a principal object of the invention to provide an improved optical detection system for use in a video disc playback apparatus.

It is the specific object of the invention to provide an optical detection system for a video disc which is capable of optically detecting and averaging the information in a plurality of adjacent track segments.

It is also an object of the invention to provide a relatively inexpensive optical detection system for a video disc.

SUMMARY OF THE INVENTION

An optical detection system, for use in an optical playback apparatus, is disclosed for deriving a time-varying information signal which has been converted to a modulated carrier and recorded upon a record disc in the form of elongated spiral track. The track comprises a sequence of light scattering elements which are arranged in a predetermined distribution along the track so that the elements collectively constitute a spatial counterpart of the modulated carrier. The optical detection system comprises means for supporting and rotating the record disc in a reading plane and means for developing an optical read beam. Means, including an objective lens, is disposed in the path of the beam for focusing the beam into a reading spot of an area sufficient to interrogate, simultaneously, a plurality of the light scattering elements in at least two adjacent segments of the spiral track. The reading spot further has a dimension in the longitudinal direction of the track such that the spot is incapable of resolving the recorded carrier. Drive means are provided for displacing the record at a predetermined velocity relative to the reading spot to effect an interrogation of the light scattering elements of the track segments by the spot so as to cause to be developed a time-varying diffraction pattern of the spot. This diffraction pattern comprises a time-varying distribution of scattered light. Finally, light responsive means are disposed adjacent to the record disc and in the far field of the reading spot to intercept a portion of the time-varying diffraction pattern and for averaging the light content of the intercepted portion to derive an electrical signal representative of the stored information.

BRIEF DESCRIPTION OF THE DRAWINGS

The features of the present invention which are believed to be novel are set forth with particularly in the appended claims. The invention, together with further objects and advantages thereof, may best be understood by reference to the following description, taken in conjunction with the following drawings, in the several figures of which like reference numerals identify like elements and in which:

FIG. 2 is a detail of part of a longitudinal section of a spatially recorded track on the video disc shown in FIG. 1;

DESCRIPTION OF THE PREFERRED EMBODIMENT

Prior to commencing discussion of the invention, it is to be noted that illustrations of portions of the disclosed optical detection system, as well as certain explanatory diagrams, have been intentionally exaggerated in order to facilitate their presentation, as well as an understanding of the invention.

Figure 1:
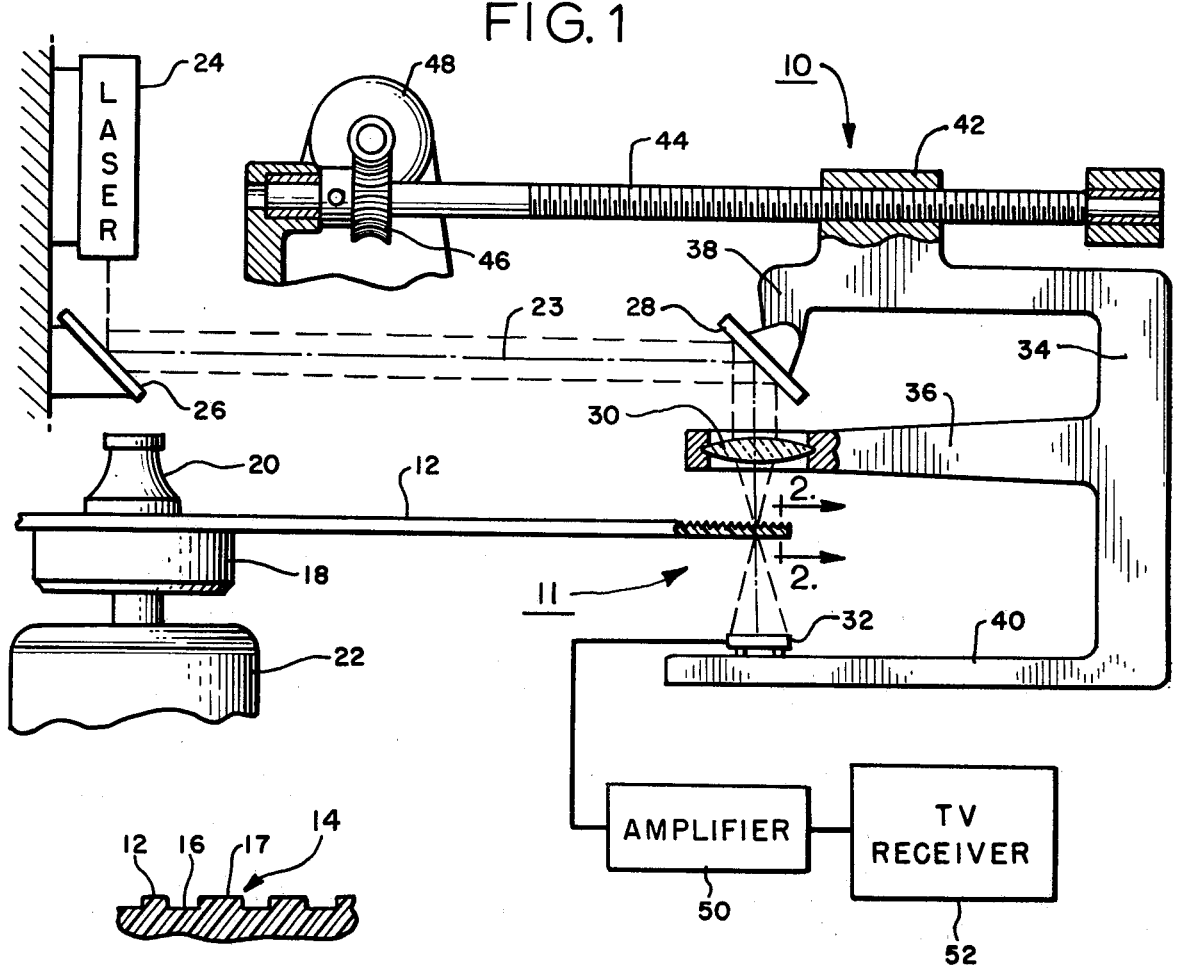
FIG. 1 is a fragmentary elevational view of an optical read out system constructed in accordance with the invention.

Accordingly, the optical playback apparatus 10 depicted in FIG. 1 comprises an optical detection system 11 which serves to detect time dependent information signals, for example, video signals, which have been converted to a modulated carrier and spatially recorded on the surface of the storage medium. In the disclosed embodiment, this medium comprises a disc 12 which, preferably, is formed from polyvinyl chloride. The particular manner in which the information signal is recorded upon the disc is of no concern in that resort may be had to either the mechanical or photographic techniques practiced in the art. For purposes of discussion, it will be assumed that the recorded information adopts the shape of an elongated spiral track 14 comprising a train of light scattering elements, or pits 16, interspersed with lands 17, which are impressed upon the upper surface of disc 12; a longitudinal section through a portion of this track is shown in FIG. 2. It will also be assumed that disc 12 is of the one-half wavelength type described above.

Turning now to the structural details of apparatus 10, and referring again to FIG. 1, the disc 12 is disclosed as supported upon the spindle 18 of a playback deck and secured thereon by a cap 20. The lower extremity of the spindle is coupled to a drive means, synchronous motor 22, which serves to rotate the disc at a predetermined velocity, preferably 1800 RPM, relative to an interrogating beam of light. In order to read track 14, the optical detection system 11 utilizes a beam 23 of monochromatic coherent light which is produced by a laser 24. The laser may be positioned at any convenient location since the beam therefrom can be directed by the mirrors 26, 28 to the focusing means, specifically to the objective lens 30, which is supported above disc 14 in a manner to be detailed below.

Figure 3:
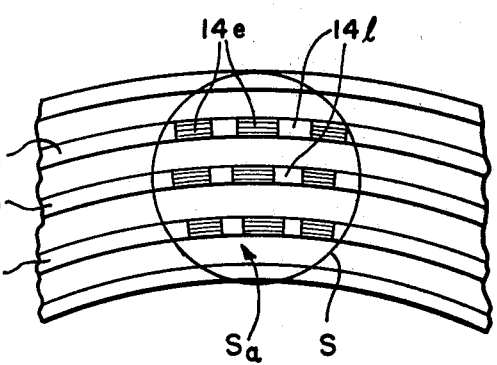
FIG. 3 is an explanatory drawing depicting the relationship of the read out spot to the record track.

Lens 30 has a numerical aperture which is such that the read spot S formed from beam 23 is so large as to be incapable of resolving the highest spatial frequency recorded on the disc. In other words, the dimension of the spot, in the longitudinal direction of the track, is of such magnitude that it is incapable of resolving the recorded carrier. Moreover, the diameter of read spot S must be large enough so that its area $S_a$ is sufficient to interrogate a plurality of light scattering elements in at least two adjacent segments of track 14. As shown in FIG. 3, spot S interrogates portions of three adjacent track segments 14a, 14b and 14c.

Referring again to FIG. 1, a light responsive means in the form of a photodetector 32 is supported immediately beneath the interrogated portion of the track and in the center of the far field of the non-scattered light of spot S which is transmitted through the disc. This choice of location for the photodetector is optional, since the optical detection system may be operated in a reflective mode, in which case the photodetector may be located above the disc so long as it is positioned in the far field of the reflected beam. Moreover, at the option of the practitioner, the photodetector can be arranged to respond to the scattered light transmitted through the disc. Moreover, insofar as the disclosed embodiment is concerned, it is preferred that, in a transmissive system, photodetector 32 be located so as to collect only non-scattered light while, in a reflective system, the photodetector is desirably positioned so as to monitor the scattered light. Such a photodetector arrangement is described in Adrianus Korpel's copending patent application Ser. No. 813,036 which was filed on July 5, 1977 now U.S. Pat. No. 4,142,098. Again, at the option of the practitioner, the photodetector in a reflective system can, alternatively, be arranged to respond to non-scattered light. In any case, the photodetector will generate an electrical signal representative of the baseband signal employed to modulate the RF carrier.

As noted, the critical factor respecting photodetector placement, is that it reside in the far field of the focused spot. In this regard, far field is defined as that region of the transmitted or reflected scattered light that is displaced from the focal point of the read spot by a distance greater than approximately $d^2/\lambda$, where d is the diameter of the spot and $\lambda$ is the wavelength of the light forming the spot. As the dimension d is usually of the order of the wavelength of light itself, the far field requirement is satisfied for distances greater than several wavelengths of light.

To enable the spot S produced by lens 30 to interrogate track 14, mirror 28, lens 30 and the photodetector 32 are supported upon a carriage 34 for conjoint travel along a path normal to the track and thus coincident with a radius of the disc. As shown in FIG. 1, lens 30 is supported by an arm 36 extending from carriage 32 while mirror 28 depends from an upper frame member 38 of the carriage. A lower frame member 40 of the carriage supports the light responsive means, i.e., the photodetector 32.

To facilitate a radial displacement of the optical reading apparatus, carriage 32 includes the housing portion 42 which threadably receives a rotatably mounted lead screw 44. The lead screw is effectively oriented perpendicular to track 14 of the disc to assure accurate radial travel of lens 30 and the photodetector. A pinion 46, fitted to one end of the lead screw, couples the lead screw to a driver 48 which can comprise an electric motor and gearing complex arranged to coordinate the radial displacement of the carriage with the rotational speed of the disc.

The electrical output signal of the photodetector is proportional to the summation of the amplitude of all the non-scattered light rays impinging on the photosensitive surface of detector 32. In effect, the photodetector averages the light it sees at any one instance. Therefore, as the track segments progress past the interrogating spot, the amount of non-scattered light is a function of the quantity of light scattering elements, or pits, illuminated by the spot.

For example, if the track segments instantaneously being interrogated were devoid of light scattering elements, then the electrical signal developed by photodetector 32 would be a maximum since the detector is arranged to respond to non-scattered light. On the other hand, if at a subsequent instant of time, one-half the area now interrogated by the spot is comprised of light scattering elements, then the electrical output signal of detector 32 would decline proportionately, actually, as will be shown, the output signal would then be minimum.

Turning now to the specific embodiment disclosed herein. As shown in FIG. 3, the reading spot S overlies three adjacent segments 14a, 14b and 14c of track 14, as well as portions of two other track segments. The light scattering elements are represented as cross-hatched rectangles $14_e$ interposed between land areas $14_l$ and sequentially disposed along an associated track segment. Let us assume that the total area encompassed by the spot is designated $A_s$ and that the area of the pits instantaneously interrogated by this spot is designated $A_p$, the latter comprising the summation of the areas of the individual pits.

$E_f$ designates the amplitude of the electric field strength of non-scattered light in the center of the far field. The sum of the amplitudes in the spot, in the absence of any light scattering pits, is $$E_f = C \cdot A_s \qquad (1)$$

where C is a constant.

In the presence of pits, on the other hand, the expression for electric field strength becomes $$E_f = C[(A_s - A_p) - A_p], \qquad (2)$$

in which the term $(A_s - A_p)$ defines the area of the lands plus the area of the informationless strips separating the tracks, minus the area of the pits.

Rewriting this expression, gives $$E_f = C[A_s - 2A_p]. \qquad (3)$$

thus the detector 32 sees only a minimum of non-scattered light.

When total land area, which includes the informationless strips that separate the tracks, is equal to the area of all the pits, then $$A_p = \tfrac{1}{2} A_s, \qquad (4)$$

in which case Equation (3) goes to zero. This situation is characterized by a maximum of scattered light, or, viewed another way, a minimum of non-scattered light.

The amount of light modulation is determined by solving for the ratio of the field strength in the presence of pits, Equation (3), to the field strength in the absence of light scattering pits, Equation (1), thusly, $$\frac{C(A_s - 2A_p)}{CA_s} = \left(1 - \frac{1A_p}{A_s}\right) \qquad (5)$$

The current developed by the photodetector would then approximate $$\left(1 - \frac{2A_p}{A_s}\right)^2$$

Figure 4:
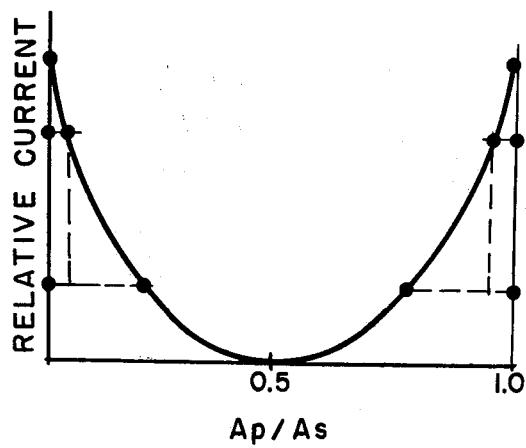
FIG. 4 is a graphical representation of the relationship of the area of the light scattering elements to the current derived by a monitoring photodetector.

FIG. 4 graphically depicts the relationship of photodetector current to the ratio of pit area, $A_p$ to spot area, $A_s$. The magnitude of photodetector current, attributable to non-scattered light is a maximum when the ratio $A_p/A_s$ is a minimum, in other words, the condition of fewest, if any, light scattering pits. This current then drops to a minimum when the ratio of pit area to spot area increases to 0.5. However, as also shown in FIG. 4, as the ratio $A_p/A_s$ continues to increase, the magnitude of photodetector current now increases. This obtains because, as the area of the pits increases, the lands between the pits now assume the role of light scattering elements so that, as the pits area eventually equals the spot area, i.e., $A_p/A_s = 1$, then the area of the lands (now, the light scatterers) approaches zero and photodetector current again approaches a maximum.

Insofar as the aforementioned relationship of photodetector current to $A_p/A_s$ ratio is concerned, desirably operation is relagated to the relatively linear portions of the curve depicted in FIG. 4. This would be those portions bounded, or set-off, by the broken construction lines.

Thus, as has been shown, a light spot S having an area $S_a$ sufficient to interrogate a plurality of track segments will develop a time-varying diffraction pattern of light. A photodetector, positioned to intercept a portion of this non-scattered light will average that light to derive an electrical signal representative of the stored information. Since the information content of adjacent tracks is substantially the same, averaging of the non-scattered light by a photodetector will provide a useful replica of the baseband signal. Since the objective lens 32 need not resolve the spatial carrier, indeed it desirably has a small numerical aperture in order that the read spot developed by it is sufficiently large to overlie a plurality of track segments.

The manner in which the optical playback apparatus utilizes the photodetector output signal will now be described. When motor 22 is energized to rotate disc 12, relative to the light spot S, driver 48 is simultaneously energized to produce a controlled inward radial displacement of the objective lens 30 and the photodetector 32 so as to effect a scan of track 14. As the sequence of pits in track segments 14a, 14b and 14c pass beneath reading spot S, a time-varying diffraction pattern of the spot is cast upon photodetector 32. By virtue of its position in the far field the photodetector will respond only to the non-scattered light of the diffraction pattern of spot S.

In response to this non-scattered light, the photodetector develops an electrical signal. This developed signal, which is a replica of the baseband signal spatially recorded on track 14, is then applied to an amplifier 50 from whence it is coupled to a television receiver 52 that reconstitutes the program.

While the invention has described in connection with a transmissive disc, it should be appreciated that it is readily utilizable with a reflective disc in an optical detection system of the type disclosed in Leonard J. Laub's U.S. Pat. No. 3,959,581. Rather than burden the subject teaching with the details of a reflective video disc optical detection system, the disclosure of U.S. Pat. No. 3,959,581 is hereby expressly incorporated herein. Moreover, to the extent they supplement the background of the subject teaching, the disclosures of the previously mentioned U.S. Pat. Nos. 3,931,459 and 3,919,562, as well as that of the copending Korpel application, are hereby expressly incorporated herein.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In an optical playback apparatus, an optical detection system for deriving a baseband signal comprising a time-varying information signal which baseband signal had been employed to modulate a carrier that was recorded upon a record disc in the form of a single plane elongated spiral track, which track comprises a sequence of light scattering elements arranged in a predetermined distribution along said track so that said elements collectively constitute a spatial counterpart of the modulated carrier, said optical detection system comprising:

means for supporting said record disc in a reading plane;

means for developing an optical read beam;

means, including an objective lens, disposed in the path of said beam for focusing said read beam into a reading spot of an area sufficient to interrogate, simultaneously, a plurality of said light scattering elements in at least two adjacent co-planar segments of said spiral track, said adjacent segments extending parallel in the direction of said elongated track, said reading spot further having a dimension in the longitudinal direction of said track such that such said spot is incapable of resolving said recorded carrier;

drive means for displacing said record support means at a predetermined velocity relative to said reading spot to effect interrogation of said light scattering elements of said track segments by said spot so as to cause to be developed a diffraction pattern of said spot, said diffraction pattern comprising a time-varying distribution of scattered and non-scattered light, said non-scattered light being representative of said baseband signal;

and light responsive means, disposed adjacent said disc and in the center of the far field of said reading spot for intercepting the non-scattered portion of said time-varying diffraction pattern and for averaging the light content of said intercepted portion to derive an electrical signal representative of the stored information in said baseband signal.

2. An optical detection system as set forth in claim 1 in which said light responsive means comprises a photodetector responsive to the non-scattered light content of said intercepted portion of said diffraction pattern.

3. An optical detection system as set forth in claim 1 in which said light responsive means comprises a photodetector responsive to the scattered light content of said diffraction pattern.

4. An optical detection system as set forth in claim 1 in which said light responsive means is positioned to intercept a portion of said time-varying diffraction pattern transmitted through said record disc.

5. An optical detection system as set forth in claim 1 in which said light responsive means is positioned to intercept a portion of said time-varying diffraction pattern reflected from said record disc.

* * * * *